(12) United States Patent
Fery et al.

(10) Patent No.: US 8,067,079 B2
(45) Date of Patent: Nov. 29, 2011

(54) OPTICAL STORAGE MEDIUM COMPRISING A MASK LAYER WITH A SUPER RESOLUTION NEAR FIELD STRUCTURE

(75) Inventors: Christophe Fery, Niedereschach (DE); Larisa von Riewel, Villingen-Schwenningen (DE); Gael Pilard, Moenchweiler (DE); Stephan Knappmann, Rottwell (DE)

(73) Assignee: Thomson Licensing, Boulogne-Billancourt (FR)

( * ) Notice: Subject to any disclaimer, the term of this patent is extended or adjusted under 35 U.S.C. 154(b) by 344 days.

(21) Appl. No.: 12/311,716

(22) PCT Filed: Oct. 11, 2007

(86) PCT No.: PCT/EP2007/060854
§ 371 (c)(1),
(2), (4) Date: Apr. 9, 2009

(87) PCT Pub. No.: WO2008/043824
PCT Pub. Date: Apr. 17, 2008

(65) Prior Publication Data
US 2010/0189950 A1    Jul. 29, 2010

(30) Foreign Application Priority Data
Oct. 13, 2006   (EP) .................................. 06122288

(51) Int. Cl.
*B32B 3/02*    (2006.01)
(52) U.S. Cl. ..................... 428/64.1; 428/64.4; 428/64.5; 430/270.12

(58) Field of Classification Search .................. None
See application file for complete search history.

(56) References Cited

U.S. PATENT DOCUMENTS 6,339,582 B1    1/2002    Ichihara et al.
6,667,146 B1 *  12/2003   Ogimoto et al. ......... 430/270.13
2003/0193857 A1 10/2003   Ichihara et al.

FOREIGN PATENT DOCUMENTS
WO       2004/088644 A1   10/2004

OTHER PUBLICATIONS

Shi et al. "Super-Resolution Near Field Phase Change Disk with Sb70Te30 Mask Layer", Japanese Journal of Applied Physics, vol. 43, No. 7B, 2004, pp. 5001-5005, XP002445699.
Shima et al. "Optical Nanotechnologies—The Manipulation of Surface and Local Plasmons", Feb. 19, 2004, Springer Berlin Heidelberg, XP002445709, pp. 49-57.
Search Report Dated Nov. 22, 2007.

* cited by examiner

*Primary Examiner* — Elizabeth Mulvaney
(74) *Attorney, Agent, or Firm* — Robert D. Shedd; Joseph J. Opalach; Jerome G. Schaefer

(57) ABSTRACT

The optical storage medium according to the invention uses a mask layer as a super resolution near field structure, which comprises a doped semiconductor material. The semiconductor material is n-doped particularly such that the reflectivity of the semiconductor material is increased, when irradiated with a laser beam. As a semiconductor material advantageously an indium alloy and as a doping material selenium or tellurium can be used. For the manufacturing of a respective optical storage medium a sputtering method for depositing the doped semiconductor material as the mask layer can be used, wherein the dopant is included already in the semiconductor sputtering target.

10 Claims, 3 Drawing Sheets

OPTICAL STORAGE MEDIUM COMPRISING A MASK LAYER WITH A SUPER RESOLUTION NEAR FIELD STRUCTURE

This application claims the benefit, under 35 U.S.C. §365 of International Application PCT/EP2007/060854, filed Oct. 11, 2007, which was published in accordance with PCT Article 21(2) on Apr. 17, 2008 in English and which claims the benefit of European patent application No. 06122288.1, filed Oct. 13, 2006.

FIELD OF THE INVENTION

The invention relates to an optical storage medium comprising a mask layer with a super resolution near field structure and to a method for manufacturing of a respective optical storage medium. Storage media of this kind may be used for example for storage and recording of data as used with consumer electronic appliances.

BACKGROUND OF THE INVENTION

Optical storage media with a super resolution near field structure (Super-RENS) offer the possibility to increase the data density of the optical recording medium by a factor of three in one dimension as compared with regular optical recording media. This is possible by a so-called super RENS structure, which is placed above a data layer of the optical recording medium, and which significantly reduces the effective size of a light spot used for reading from and/or writing to the optical storage medium. The super resolution layer corresponds also, in a simplified picture, with a mask layer, because it is placed above the data layer and only the high intensity center part of a laser beam can penetrate the Super-RENS layer. However, also other types of Super-RENS layers are known where the reflectivity in the center point of the laser beam is increased.

A super resolution near field technique for recording and retrieving small marks beyond the optical diffraction limit is described be Tominaga, Nakano and Atoda in "An approach for recording and readout beyond the diffraction limit with an Sb thin film", Applied Physics Letters, Vol. 73, No. 15, 12 Oct. 1998, which describe to use an Sb thin film as the super resolution layer.

The Super-RENS layers at present under development for future optical storage media have the drawback that a high laser power is needed to heat the mask layer and the respective surrounding protection layers.

It is known that also semiconductor materials can be used as a mask layer for Super-RENS optical storage media, for example ZnO. A semiconductor material of this kind for a Super-RENS layer is described by Takamori et al, "Energy-Gap-Induced super-Resolution Optical Disc using ZnO Interference Film", Japanese Journal of Applied Physics, Vol. 44, No. 5b, 2005, pp. 3627-3630. Takamori et al describe a Super-RENS disc with ZnO as an active layer deposited on a ROM type substrate and show that a temperature rise can locally increase the ZnO transmittance, thus triggering a near field interaction capable of below-diffraction-limit detection.

In the articles Hyot et al, "Phase change materials and Super-RENS", E*PCOS 05, Technical Digest, Cambridge, 2005, and Pichon et al, "Multiphysics Simulation of Super-Resolution BD ROM Optical Disk Readout" 2006 IEEE, 0-7803-9494-1/06, PP 206-208, a semi-conducting mask layer is proposed in which a local change of the refractive index can be obtained through photo generation of free carriers. A thermal description is given to provide information on temperature distribution during readout of the data layer.

In US2003/0193857 an optical disc comprising a Super-RENS mask layer is described comprising a semiconductor film which can have a contamination or a matrix material mixed into the semiconductor which is not more than 20 at %. The Super-RENS detection is based on an increase of the transmittance of the mask layer, which the transmittance being increased by absorption saturation of the semiconductor layer upon radiation with an incident laser beam. The mask layer may include impurities, which allows to shift the energy gap such that efficient absorption is obtained for a certain wavelength. An embodiment is described for which a GaP layer can be utilized as a Super-RENS layer when doping the GaP layer with Be, which provides an acceptor level, or Te, which provides a donor level. This allows an absorption saturation of the GaP layer by providing electron excitation when using a reproduction beam having a wavelength of 650 nm. For providing absorption saturation, a comparatively high laser power is required, for example 1.3 mW when using a pulsed laser source.

BRIEF SUMMARY OF THE INVENTION

It is an object of the present invention to provide an optical storage medium comprising a mask layer with a super resolution near field structure, which can be easily manufactured, and which can be used in particular with a lower laser power.

This object is achieved for an optical storage medium by the features as described in claim 1 and by a method for manufacturing an optical storage medium as described in claim 8. Preferred embodiments of the invention are described in the dependent claims.

The optical storage medium according to the invention uses a mask layer as a super resolution near field structure, which comprises a doped semiconductor material. The semiconductor material is in particular n-doped such that the reflectivity of the semiconductor material is increased, for providing a high reflectivity factor when irradiated with a laser beam, in accordance with the Drude model of free electrons in solids.

As a semiconductor material, advantageously an indium alloy and as a doping material selenium or tellurium can be used. Measured data show that a reflectivity change of typically about a factor of 2 can be obtained with increasing laser power, when using a selenium or tellurium doped semiconductor mask layer. Other doped semiconductor materials may even provide higher reflectivity changes.

For the manufacturing of a respective optical storage medium a sputtering method for depositing the doped semiconductor as a mask layer can be used, wherein the doped semiconductor material is in a preferred InSb and the dopant is included already in the semiconductor sputtering target.

The optical storage medium is in particular an optical storage disc comprising a super resolution near field structure (Super-RENS) as a mask layer. Such a mask layer can be easily manufactured, when using a doped semiconductor material, and by using a suitable donation, a lower laser power seems to be possible for writing and reading of data in comparison with other Super-RENS storage media.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
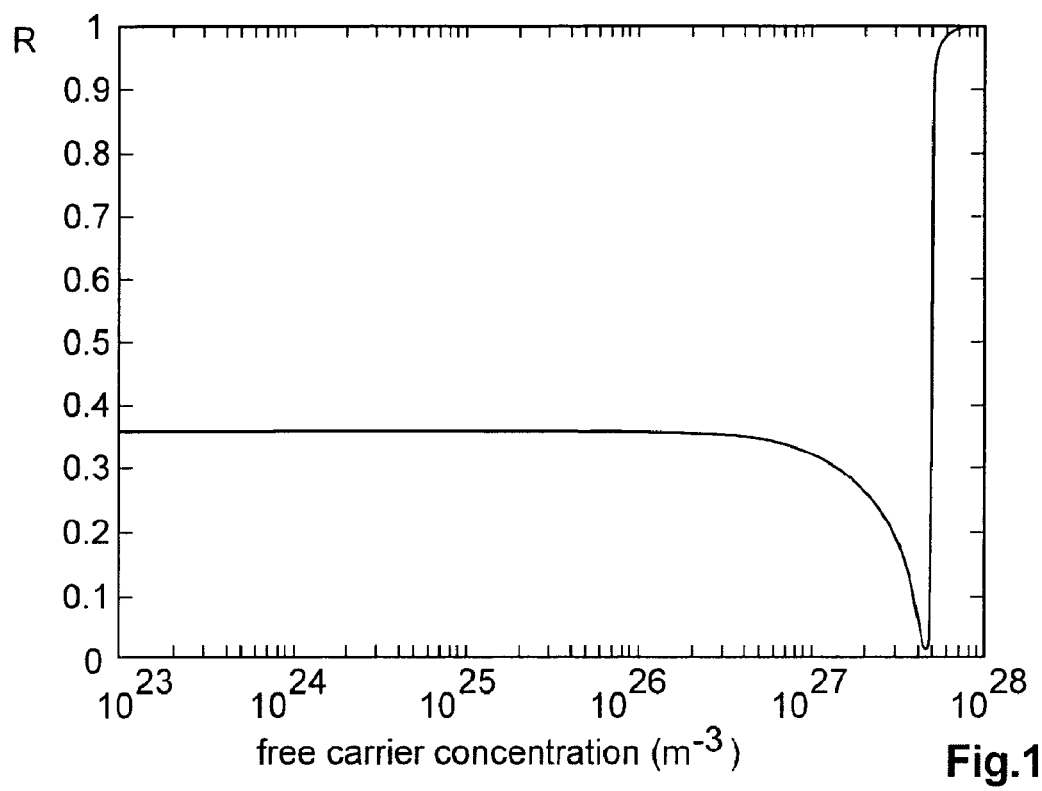
FIG. 1 a calculated reflectivity factor as a function of the free carrier concentration for an InSb layer, FIG. 2 a calculation of the absorption coefficient in dependency of the free carrier concentration for an InSb layer, FIG. 3 calculation of the reflectivity of an n-doped semiconductor in dependency of the laser power and the doping concentration of the semiconductor, FIG. 4 a simplified cross section of an optical storage medium comprising a doped semiconductor layer as a mask layer, FIG. 5 reflectivity measurements as a function of the laser power for doped semiconductor mask layers with different tellurium concentrations, and FIG. 6 reflectivity measurements as a function of the laser power for doped semiconductor mask layers with different selenium concentrations.

The reflectivity R of a thin semiconductor layer is a function of the free carrier concentration and the thickness. The free carrier concentration can be calculated by using the Drude model of free electrons in solids. For a semiconducting layer with a thickness d, one can write the free carrier concentration N as follows:

$$N \propto (1-R) \cdot [1 - \exp(-\alpha d)] \frac{1}{d}$$

where $\alpha$ is the absorption coefficient of the material. The resulting reflectivity R as a function of the free carrier concentration is shown in FIG. 1 for an InSb layer. As can be seen, above a certain threshold of the free carrier concentration, the reflectivity rises to a level of almost one.

Figure 2:
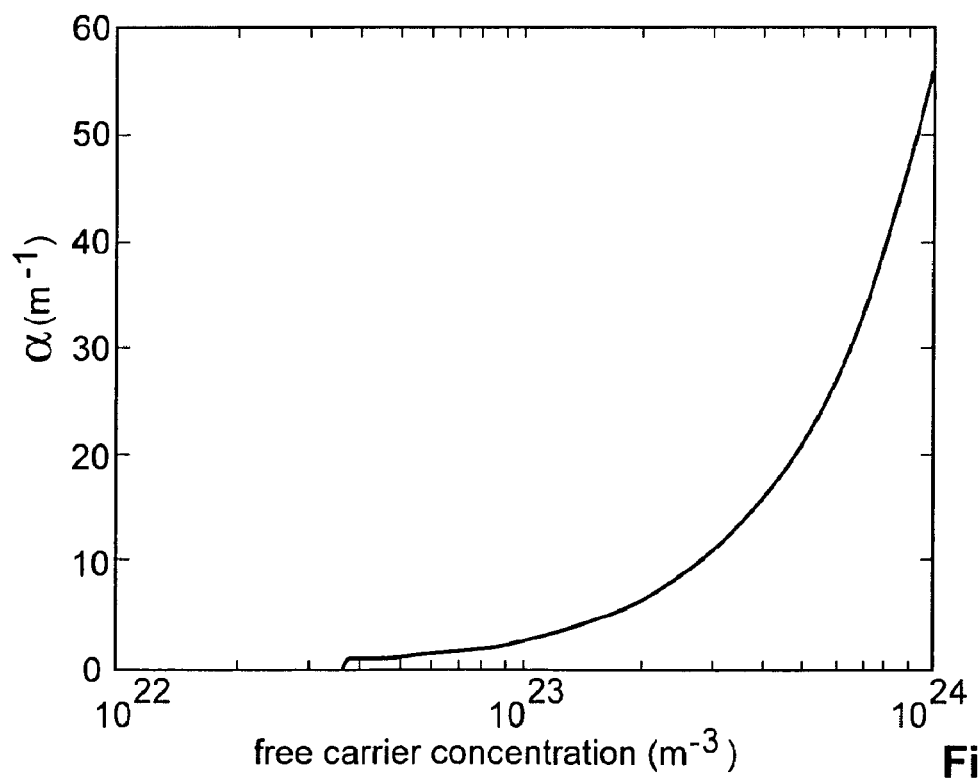

The dependency between the absorption coefficient $\alpha$ and the free carrier concentration N is shown in FIG. 2, which shows the calculated absorption coefficient $\alpha$ as a function of the free carrier generation $N_0$ for an InSb layer. Thus, by increasing $\alpha$, the free carrier concentration will be enhanced.

Figure 3:
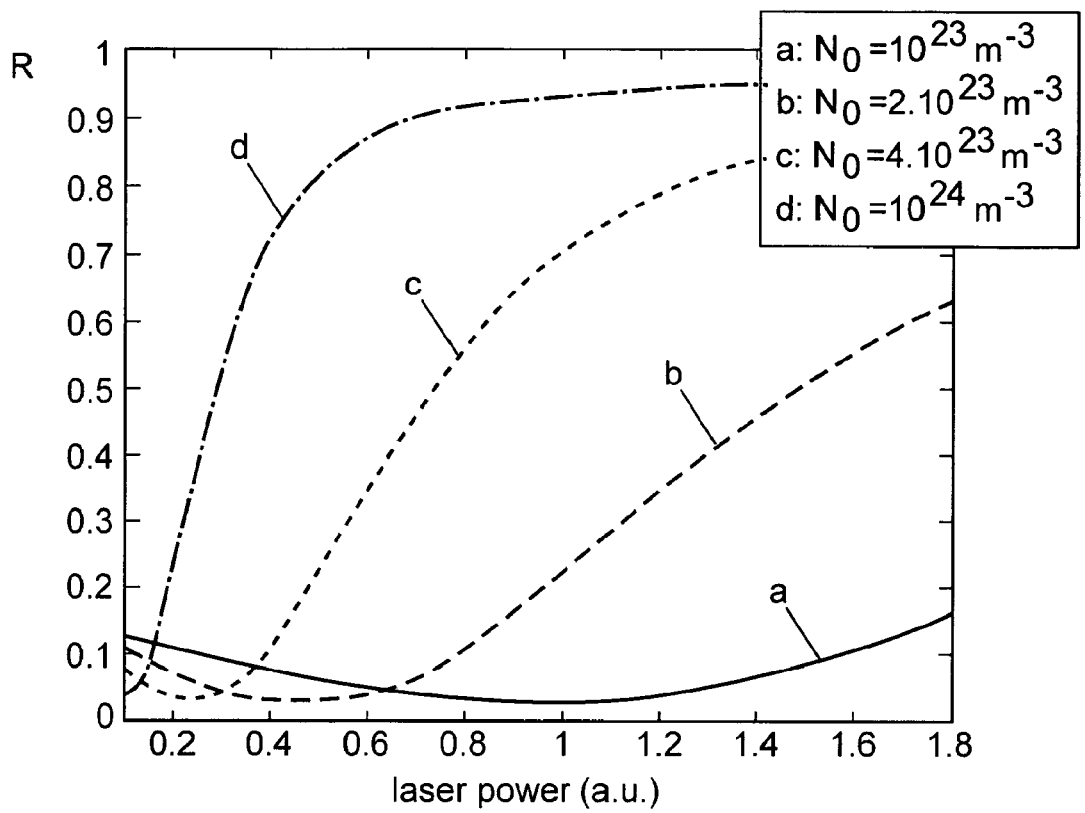

If the semiconductor is doped, the absorption coefficient $\alpha$ is much higher and because the free carrier generation $N_0$ is correspondingly also higher, the reflectivity of the semiconductor layer is enhanced therefore. In addition, the free carrier concentration can be enhanced in particular by laser absorption from an initial intrinsic carrier concentration N to a concentration N' when irradiated. This is shown in FIG. 3, where the reflectivity R is plotted as a function of the laser power for several doping concentrations.

The semiconductor material is in particular n-doped for increasing the number of free electrons representing the free carrier concentration N. When the doping increases to a value of $10^{24}$ m$^{-3}$, a high reflectivity factor can be obtained even when using a comparatively low laser power. Then, one can expect to trigger a near-field Super-RENS effect already at a lower laser power, thus limiting the heat dissipation in the disk. As can be seen in FIG. 3, a doping with a concentration of $N_0=10^{24}$ m$^{-3}$ is sufficient for providing a change of the reflectivity factor from about 0.2 to 0.8, when increasing the laser power from 0.2 to 0.4 arbitrary units.

Therefore, the laser power for reading data from the optical storage medium can be adjusted such that only for a small center part of the laser beam a high reflectivity is obtained, hence having a low reflectivity of the outer parts of the laser beam. This has the effect, that only the center beam interacts with the data layer by means of the super resolution near-field effect, which allows therefore to reduce the readout spot size considerably below the diffraction limit of the applied laser beam. It is therefore expected that already a laser power below 1 mW is sufficient for reading a Super-RENS optical storage medium at a moderate linear speed.

By using a sufficiently high doping of the semiconductor material, the laser power and therefore the heat dissipation of the optical storage medium can be considerably reduced. This is in particular the case because the Super-RENS effect is provided by a change of the reflectivity of the mask layer for the inner laser beam part with regard to the outer laser beam, and not by heating effects of the mask layer, as necessary for prior art Super-RENS optical storage media.

Figure 4:
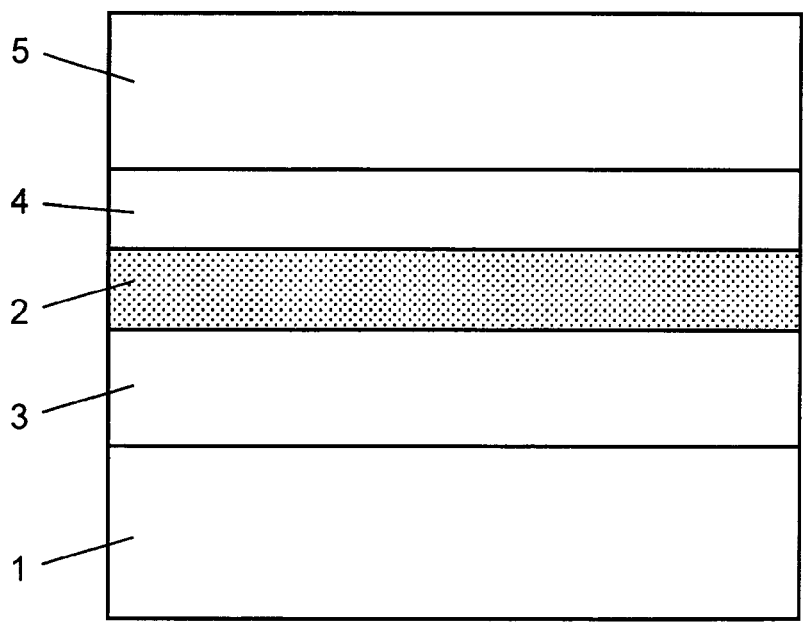

A simplified structure of a respective optical recording medium is shown in a cross section in FIG. 4. Data information with marks and spaces is embossed as a pit structure into a plastic substrate 1. Above the substrate 1, a Super-RENS layer as a mask layer 2 is arranged, comprising for example an indium-antimonide alloy, InSb, semiconductor, which is n-doped. Between the substrate 1 and the mask layer 2 a first protective layer 3 and above the mask layer 2 a second protective layer 4 may be arranged comprising the material: ZnS:SiO2. Above the protection layer 4 a cover layer 5 is arranged.

As a material for n-doping the indium-antimonide layer 2, for example selenium, SE, or tellurium, Te, can be used. Instead of InSb also other Indium-alloy semiconductor materials, for example InN, InP, InAs, or InSb, being doped respectively, can be used. Advantageous are in particular materials of the III-V semiconductor family having a bandgap of below 1 eV, which is the case in particular for InAs (0.354 eV), InSb (0.17 eV) and GaSb (0.726 eV). The low bandgap provides a high free carrier concentration and therefore a high reflectivity factor when irradiated with a laser beam, as explained before.

An optical storage medium as shown in FIG. 4 can be manufactured by the following steps: In case of a read only data disc, a ROM disc, a pit structure is embossed or molded into the plastic substrate 1. Then the layers 3, 2 and 4 are deposited on the layer 1 as a multilayer by sputtering the materials ZnS:SiO2, n-doped InSb, and again ZnS:SiO2. In a following step the cover layer 5 is applied for the optical storage medium. For providing the doped semiconductor layer 3, the doping material can be included already into the semiconductor sputtering target, for example an InSb sputtering target. The doping concentration selected for the sputtering target can be transmitted then easily to the mask layer 2.

Figure 5:
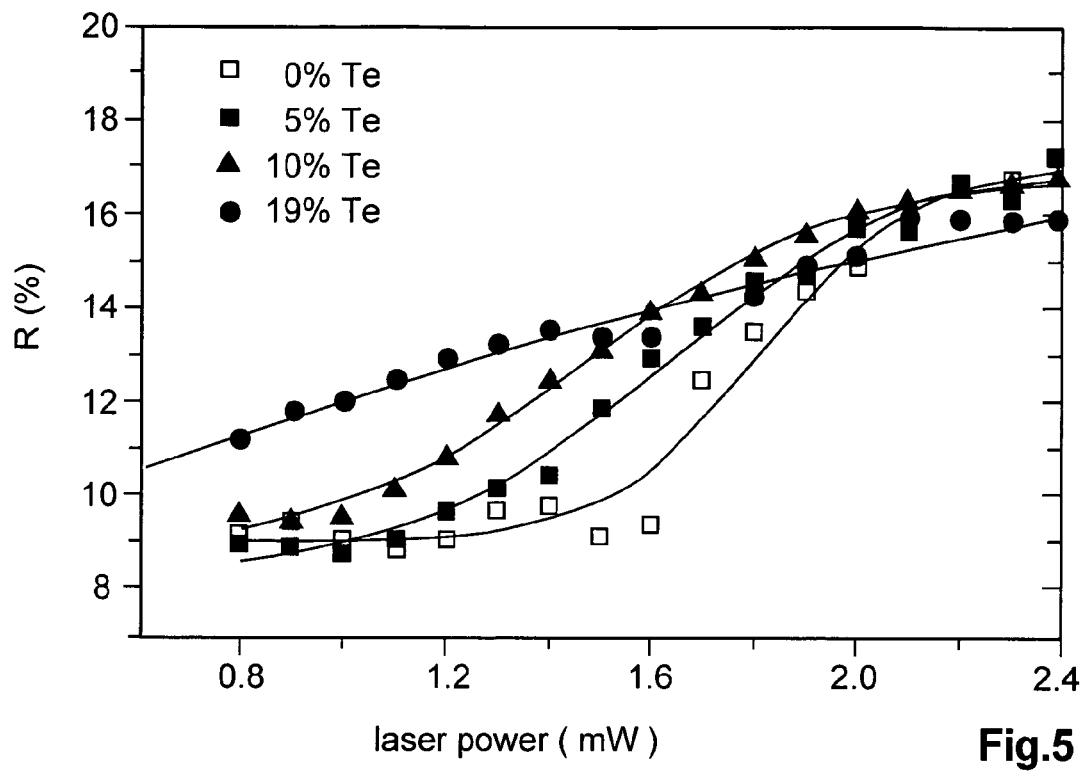
Figure 6:
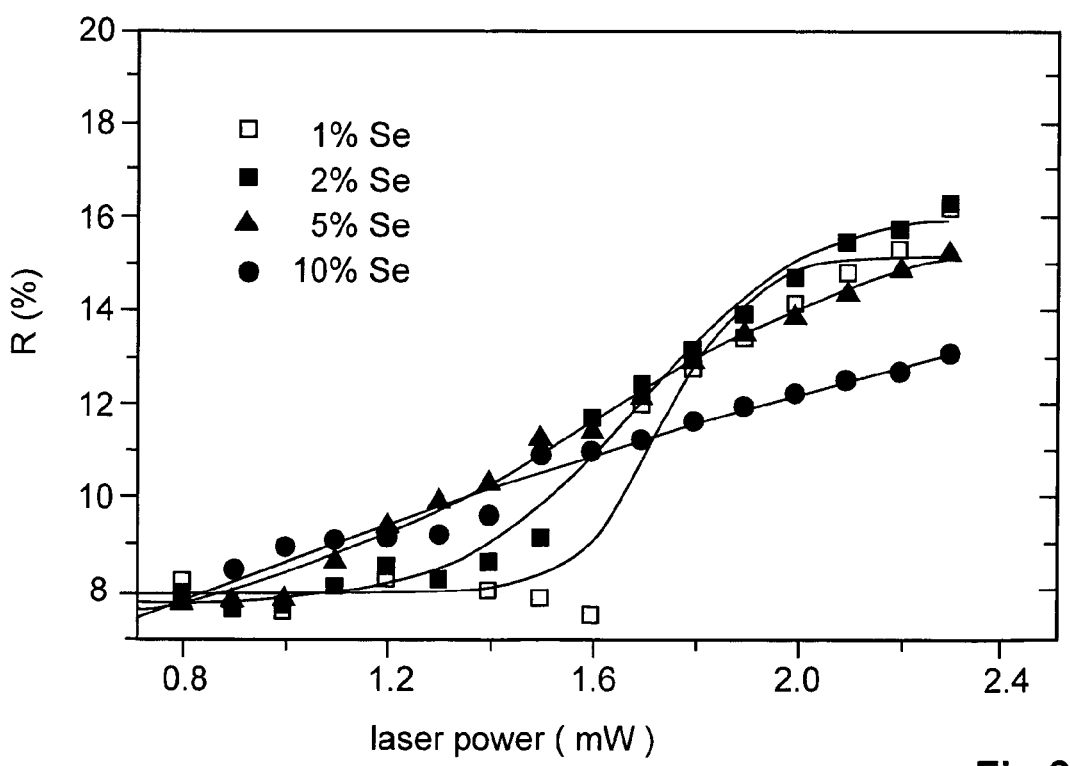

Experimental data show a change of the reflectivity factor by a factor of two with increasing laser power in comparison with the initial reflectivity at low laser power. As can be seen in FIG. 4, which shows the reflectivity R in % as a function of laser power for different Te doping concentrations, and FIG. 5, which shows the reflectivity R in % as a function of laser power for different Se doping concentrations, the reflectivity jump is shifted towards lower laser power when the dopant concentration increases. At higher donor concentration, in particular for the Te doping, no significant reflectivity jump is observed anymore.

As described above, for reading the optical storage medium as shown in FIG. 3, the laser power is adjusted such, that only the center part of the laser beam has an intensity, which is sufficient to increase the reflectivity of the mask layer 2 substantially. Then only the increased number of carriers according to the center beam generate a near field interaction with the marks and spaces of the track of the data layer 1, which is arranged closely to the mask layer 2. The near field interaction is strongly dependant on the pit and land structure of the substrate 1 below the mask layer 2. The reflectivity of the center part of the laser beam is therefore modulated by the pit structure of the corresponding track.

Because the Super-RENS effect of the mask layer 2 is based on a change of the reflectivity of the doped semiconductor material, no substantial heating of the mask layer 2 is necessary, respectively takes place. This has the advantage, that the lifetime of the disk and also of the laser is increased, and that the power consumption of a respective optical data reader or data recorder can be decreased accordingly. In particular by using an n-doping, the generation of free carriers providing the high reflectivity of the semiconductor material can be substantially increased.

Also other embodiments of the invention can be made by a person skilled in the art without departing from the spirit and scope of the invention, the invention resides therefore in the claims herein after appended.

The invention claimed is:

1. Optical storage medium comprising a mask layer with a super resolution near field structure, wherein the mask layer comprises an n-doped semiconductor material having a dopant which is selected such that the reflectivity of the mask layer is increased, when irradiated with a laser beam.

2. Optical storage medium according to claim 1, wherein the semiconductor material is one of the III-V semiconductor family having a bandgap of below 1 eV.

3. Optical storage medium according to claim 2, wherein the semiconductor material comprises an indium alloy, for example InN, InP, InAs, or InSb.

4. Optical storage medium according to claim 2, wherein the doped semiconductor material comprises a Ga alloy, for example GaSb.

5. Optical storage medium according to claim 1, wherein the dopant of the semiconductor material is selenium or tellurium.

6. Optical storage medium according to claim 1, wherein the semiconductor material is n-doped such that the reflectivity of the semiconductor material is increased at least by a factor of 2, when irradiated with a laser beam having a wavelength within the visible range.

7. Optical storage medium according to claim 1, comprising a substrate layer, the mask layer being disposed on the substrate layer, a first protective layer arranged between the substrate layer and the mask layer, a second protective layer arranged above the mask layer, and a cover layer disposed on above the protection layer.

8. Method for manufacturing an optical storage medium according to claim 1, with the step of using a sputtering method for depositing the doped semiconductor material.

9. Method according to claim 8, wherein the semiconductor material is an indium alloy, for example InN, InP, InAs, or InSb and the dopant is selenium or tellurium being included already in the semiconductor sputtering target.

10. Optical storage medium according to claim 3, wherein the dopant of the semiconductor material is selenium or tellurium.

* * * * *